June 30, 1936.  L. W. BLAU ET AL  2,046,104

METHOD AND APPARATUS FOR SEISMIC PROSPECTING

Filed Dec. 14, 1932  2 Sheets—Sheet 1

Ludwig W. Blau Inventors
Louis Statham
By
W. E. Currie Attorney

June 30, 1936.  L. W. BLAU ET AL  2,046,104
METHOD AND APPARATUS FOR SEISMIC PROSPECTING
Filed Dec. 14, 1932   2 Sheets-Sheet 2

Ludwig W. Blau  Inventors
Louis Statham
By W. E. Currie Attorney

Patented June 30, 1936

2,046,104

UNITED STATES PATENT OFFICE 2,046,104

METHOD AND APPARATUS FOR SEISMIC PROSPECTING

Ludwig W. Blau and Louis Statham, Houston, Tex., assignors to Standard Oil Development Company, a corporation of Delaware Application December 14, 1932, Serial No. 647,084

17 Claims. (Cl. 181—0.5)

This invention relates to improvements in seismic prospecting. More particularly it relates to an improved method and apparatus for cancelling out different waves, that is waves of different types and wave lengths for sufficient lengths of time to permit of the clear recording of reflections.

The invention will be fully understood from the following description taken in connection with the accompanying drawings in which latter—

In seismic prospecting vibrations are sent out from some source and recorded after refraction, reflection, etc., at boundary surfaces by means of seismographs located at any desired distance from the source. In prospecting for oil, explosions of dynamite are commonly used to generate the vibrations. It is well known that earthquake shocks, both artificial and natural, are composed of several types of vibrations or waves. The first waves to arrive at the seismograph are longitudinal waves in which the particles vibrate in the direction of propagation of the wave. The transverse waves arrive next. In the transverse waves the particles vibrate in a plane perpendicular to the direction of propagation. The so-called Rayleigh and Love waves are still slower than the transverse waves.

In seismology, and especially in reflection shooting, only times of arrival of the longitudinal waves are used by the observer, but the reflections, arriving after the direct longitudinal waves, are in general so distorted by the transverse waves, if these are not eliminated, so as to make their identification impossible. It is in many cases possible to eliminate or at least to reduce the intensity of the transverse waves since they are low frequency waves. In many areas, however, the higher frequencies of the longitudinal waves are absorbed, leaving only their low frequency components. Any device or arrangement which will eliminate or reduce the low frequency transverse waves will also eliminate or reduce the low frequency components of the longitudinal waves. Hence if in such cases the high frequencies are absorbed, nothing, or very little, is left of the reflections; therefore transverse waves cannot be eliminated by mechanical, acoustical, or electrical filters in such areas.

Figure 1:
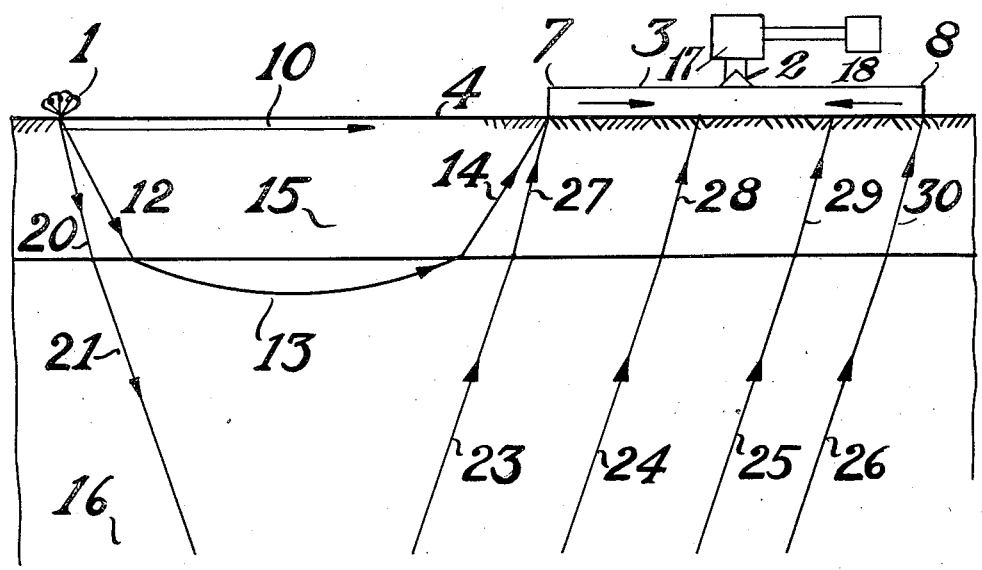
Fig. 1 is a diagrammatic view of a preferred form of apparatus.
Figure 2:
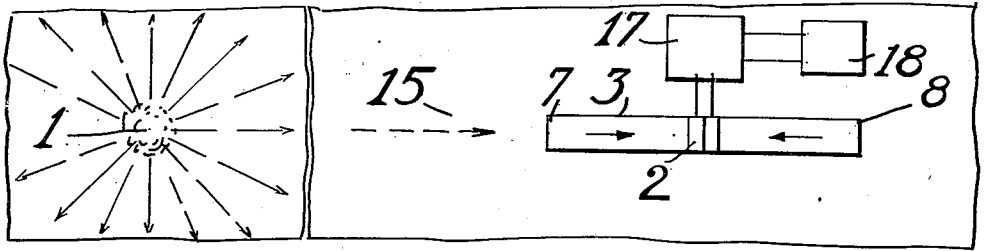
Fig. 2 is a top plan view of the structure illustrated in Fig. 1.

Referring particularly to Figs. 1 and 2, numeral 1 designates the shotpoint or source of disturbance of seismic waves. Reference numeral 2 designates a seismograph. The seismograph 2 rests upon a beam 3. The beam 3 rests upon the surface of the ground 4. In the embodiment illustrated the beam 3 extends substantially radially with respect to the source 1 of seismic waves. The end 7 of the beam lies nearest the shotpoint 1 and the end 8 of the beam lies farthest from the shotpoint. The beam may be disposed at any convenient or desirable distance from the source 1 of seismic waves. If desired a plurality of units comprising a beam and its supported seismograph may be used and at different distances from the source 1 of seismic waves. In practice it has been found that good results can be obtained from the use of one or two of the units and that six units will be sufficient in most cases.

A few rays have been drawn indicating the paths of the waves. At the instant when the waves are generated at the source 1, longitudinal and transverse waves proceed in all directions. One wave 10 is shown travelling along the surface of the ground toward the beam 3. Another wave, 12, 13 and 14, travels from the source 1 of seismic waves through an intervening layer 15, to a refracting layer 16 of the ground, thence approximately horizontally in this layer 16 to be refracted back into the upper layer 15. This wave arrives at different points of the beam 3 at different times depending upon the velocity in the layer of ground 16. It is to be noticed, however, that the wave 14 upon arriving at the end 7 of the beam travels in the beam 3 from the point 7 to the seismograph 2. Waves reaching the beam anywhere between the points 7 and 8 must travel within the beam for different distances before they reach the seismograph 2. Thus all waves arriving along the length of the beam are finally received by the seismograph 2 placed anywhere on the beam but preferably placed at about two-thirds of the length of the beam from the end 7 or at the middle of the beam. The seismograph is connected to an amplifier 17 and oscillograph 18.

The beam is constructed of iron or of any other suitable material such as wood, concrete or the like. Iron is preferred. The velocity of the waves in the beam is higher than in the surface layers 15 of the ground. Some of the waves will interfere with each other while others will reenforce each other. Reflected waves, especially, arriving as they do at the surface at very nearly the same time if the depth to the reflecting layer is large compared with the distance from the source 1 to the seismograph 2, are re-enforced markedly.

By way of concrete example, an iron beam 200 feet long is used. The velocity of longitudinal waves in the iron beam will be approximately 16,000 feet per second. A wave will therefore travel along the length of the beam in $$\frac{200}{16000} = 0.0125 \text{ second}$$

Any wave such as 10 will travel 200 feet in the ground along the surface in approximately 0.2 second, since the velocity along the surface may be taken as 1000 feet per second. A wave 12, 13, 14 refracted from the layer 16 into the surface layer 15 travels with a velocity of about 6000 feet per second in the layer 16. It will travel a distance of 200 feet in about 0.033 second. These waves followed by their transverse components keep the ground upon which the beam lies disturbed for several seconds after the time when the first components arrive. The disturbance lasts longer if the intensity of the source is increased. Reflections which are available in prospecting for oil and minerals arrive from 0.6 second to about 3 seconds after the release of the waves constituting them from the source 1. The apparent surface velocity is numerically greater than 20,000 feet per second. Infinite and negative apparent surface velocities have been observed for the reflection may arrive at all points from a given distance simultaneously, or it may arrive at the farther point first and travel back toward the source, apparently along the surface. In other words, a reflection arrives at the point 8 less than 0.01 second after it arrived at the point 7. Thus all the energy arriving over a distance of 200 feet is recorded by the single seismograph 2 in less than 0.01 second. This assures a sharp and easily identified deflection on the seismogram.

An additional wave 20 is shown travelling from the source 1 to the refracting layer 16 where it assumes the path 21. Other waves 23, 24, 25 and 26 are shown travelling upwardly diagonally through the refracting layer 16 and assuming the paths 27, 28, 29 and 30 respectively in the upper layer 15 and which strike the beam 3.

Figure 3:
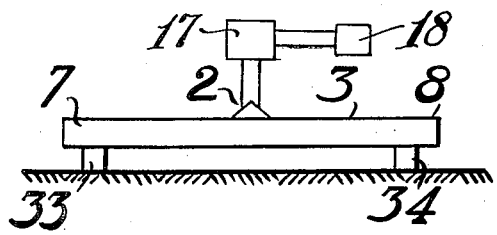
Fig. 3 is a side elevational view of an alternative form of the invention.
Figure 4:
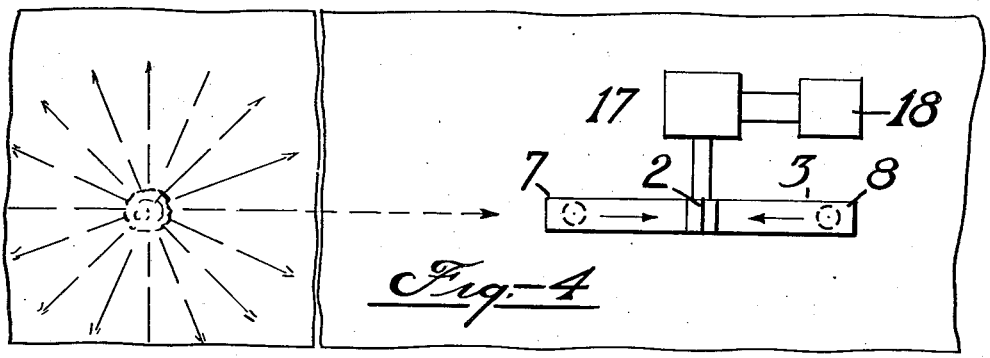
Fig. 4 is a top plan view of the apparatus illustrated in Fig. 3.

Referring particularly to Figs. 3 and 4, a modified form of the invention is shown in which the beam 3 rest upon blocks 33 and 34 which in turn rest upon the surface of the ground. The seismograph 2 is disposed upon an intermediate portion of the beam 3. With this construction it will be seen that only the instants when waves arrive at the ends of the beam are recorded. Waves arriving at the surface of the ground between the blocks 33 and 34 have no effect upon the seismograph. Reflections, however, arrive at both blocks 33 and 34 less than 0.01 second apart, if a 200 foot beam is used. The two impulses are then recorded sensibly as one, resulting in a marked increase of the deflection on the seismogram. It will be understood that more blocks spaced in any desired manner whatever can be used. The seismograph is usually placed near the middle of the beam 3 or near the end 8 farther from the source. It is thus practical to concel out particularly undesirable waves by causing them to arrive at the seismograph one-half period out of phase. A particularly strong transverse wave may arrive at the beam simultaneously with a reflection of about the same frequency and with other waves due probably to reverberations or resonance effects in the ground or in nearby trees or other objects. By properly spacing the blocks and suitably placing the seismograph on the beam the undesirable waves can be cancelled out for a few hundredths of a second at the time when a reflection arrives, thus affording an opportunity to record the reflected wave by itself. In working an area the operative learns from the seismograms on which reflections are indicated that the time of arrival of the reflection is between approximately 1.95 and 2.0 seconds. However, reflection times of arrival must be known to one thousandth of one second since a difference of one thousandth at about two seconds implies a difference in the depth of the reflecting layer of approximately 6 or 7 feet. If the record can be cleared of undesirable deflections by the procedure described above between the time marks 1.95 and 2.0 seconds, the reflection is recorded clearly and it is found to arrive at 1.978 seconds, a valuable and very much desired result.

By the procedure described different waves, waves of different types and wave lengths, can be cancelled out for short times, but for sufficiently long times to permit of the clear recording of reflections. The different waves are cancelled against each other for short, but yet sufficiently long intervals of time. The reflections are thus recorded accurately with the results that reliable depths of the different reflecting layers are attained. The procedure described amounts to collecting for each seismograph, all the energy arriving by different paths from the source over an area defined by the length and the width of the beam. The amount of energy which is received and recorded by the seismograph is increased. In actual field operation the sensitivity of the recorder is customarily decreased to that the "noise" is not recorded whereby the reflections are easily identifiable.

While the invention has been described as making possible the recording of reflections in those areas where the high frequency components of the reflections are absorbed while travelling from the source 1 of disturbance to the seismograph 2, it will be understood that the invention is not limited in the scope of its application to such areas, but that the application of the invention will always result in marked improvement of the reflection seismogram.

By the term "extended area" as used in the claims is meant any area greater than the area of the base of a single seismograph. The base of a seismograph has commonly had a diameter as large as six inches.

Various changes may be made within the scope of the appended claims in which it is desired to claim all novelty inherent in the invention as broadly as the prior art permits.

We claim:

1. In a system for geophysical exploration, a source of seismic waves, a beam of higher conductivity for the waves than the surface layer of the ground spaced from the source of seismic waves and resting upon the surface of the ground, and a seismograph resting upon the beam intermediate its ends actuated by the waves received by the beam whereby undesired seismic waves are cancelled.

2. In a system for geophysical exploration, a source of seismic waves, spaced blocks resting upon the ground in spaced relation to the source of seismic waves, a beam resting upon the blocks, and a seismograph resting upon the beam intermediate its ends actuated by the waves received by the beam whereby undesired seismic waves are cancelled.

3. In a system for geophysical exploration, a source of seismic waves, a plurality of spaced beams resting upon the surface of the ground and a seismograph resting upon each beam intermediate its ends and actuated by the waves collected by the beam whereby undesired seismic waves are cancelled.

4. Apparatus for recording seismic disturbances, comprising a seismograph, means of greater conductivity than the surface layer of the ground for simultaneously collecting over an area larger than the base of the seismograph all the energy arriving through the ground by different paths and for conducting the collected energy to the seismograph to cause the direct waves to actuate the seismograph at successive intervals of time while the reflected waves received at the area actuate the seismograph simultaneously.

5. Apparatus for recording seismic disturbances, comprising a seismograph, means for simultaneously collecting over spaced areas each larger than the base of the seismograph all the energy arriving through the ground by different paths, and means of greater conductivity than the surface layer of the ground for conducting the collected energy to the seismograph.

6. The method of utilizing earth wave energy to actuate a seismograph, which comprises simultaneously collecting over an area larger than the area of the base of the seismograph all the energy arriving through the ground by different paths, and conducting the collected energy to the seismograph through a conductor at sufficiently greater speed than the travel of the energy through the surface layer of the ground to cause the direct waves to actuate the seismograph at successive intervals of time while the reflected waves received at the area actuate the seismograph simultaneously.

7. The method of utilizing earth wave energy to actuate a seismograph, which comprises simultaneously collecting over an area larger than the area of the base of the seismograph all the energy arriving through the ground by different paths and conducting only the collected energy to the seismograph through a conductor at sufficiently greater speed than the travel of the energy through the surface layer of the ground to cause the direct waves to actuate the seismograph at successive intervals of time while the reflected waves received at the area actuate the seismograph simultaneously.

8. The method of utilizing earth wave energy to actuate a seismograph, which comprises simultaneously collecting over a plurality of spaced areas each larger than the area of the base of the seismograph all the energy arriving through the ground by different paths, and conducting the collected energy to the seismograph through a conductor at sufficiently greater speed than the travel of the energy through the surface layer of the ground to cause the direct waves to actuate the seismograph at successive intervals of time while the reflected waves received at the area actuate the seismograph simultaneously.

9. The method of geophysical exploration, which comprises propagating seismic waves from a given source, receiving over an elongated area in contact with the ground disposed substantially radially of the source wave energy arriving throughout the area from the source, and conducting the received wave energy to an indicator through a conductor at sufficiently greater speed than the travel of the energy through the surface layer of the ground to cause the direct waves to actuate the indicator at successive intervals of time while the reflected waves received at the area actuate the indicator simultaneously.

10. The method of geophysical exploration, which comprises propagating seismic waves from a given source, receiving in an elongated conductor in contact with the ground extending substantially radially from the source seismic wave energy arriving throughout the conductor from the source, and operatively associating an indicator with an intermediate portion of the conductor, the conductor being of sufficiently greater conductivity than the surface layer of the ground to cause the reflected waves to actuate the indicator simultaneously while the direct waves actuate the indicator at successive intervals of time.

11. The method of geophysical exploration, which comprises propagating seismic waves from a given source, receiving in an elongated conductor in contact with the ground extending substantially radially from the source seismic wave energy arriving throughout the conductor from the source, and operatively associating an indicator with the conductor at approximately two-thirds the length of the conductor from the end of the conductor adjacent the source, the conductor being of sufficiently greater conductivity than the surface layer of the ground to cause reflected waves to actuate the indicator simultaneously while direct waves actuate the indicator at successive intervals of time.

12. Apparatus for geophysical exploration, which comprises a source of propagation of seismic waves, an elongated conductor extending substantially radially from the source in contact with the ground to receive wave energy arriving throughout the conductor from the source, an indicator operatively associated with the conductor, the conductor being of sufficiently greater conductivity than the surface layer of the ground to cause reflected waves to actuate the indicator simultaneously while direct waves actuate the indicator at successive intervals of time.

13. Apparatus for geophysical exploration, which comprises a source of propagation of seismic waves, an elongated conductor extending substantially radially from the source in contact with the ground operative to receive seismic energy arriving throughout the conductor from the source, an indicator operatively associated with an intermediate portion of the conductor, the conductor being of sufficiently greater conductivity than the surface layer of the ground to cause reflected waves to actuate the indicator simultaneously whereas direct waves actuate the indicator at successive intervals of time.

14. Apparatus for geophysical exploration, comprising a source of propagation for seismic waves, an elongated conductor extending substantially radially from the source in contact with the ground adapted to receive seismic energy arriving throughout the conductor from the source, an indicator resting upon an intermediate portion of the conductor actuated by the seismic energy received by the conductor, the conductor being of sufficiently greater conductivity than the surface layer of the ground to cause reflected waves to actuate the indicator simultaneously whereas direct waves actuate the indicator at successive intervals of time.

15. Apparatus for geophysical exploration, which comprises a source of propagation of seismic waves, an elongated conductor extending substantially radially from the source in contact with the ground operative to receive seismic energy arriving throughout the conductor from the source, an indicator operatively associated with the conductor at approximately two-thirds the length of the conductor from the end of the conductor adjoining the source, the conductor being of sufficiently greater conductivity than the surface layer of the ground to cause reflected waves to actuate the indicator simultaneously whereas direct waves actuate the indicator at successive intervals of time.

16. The method of geophysical exploration, which comprises propagating seismic waves from a given source, receiving at spaced areas disposed in contact with the ground substantially radially of the source wave energy arriving at the areas from the source, and conducting the received wave energy to an indicator through a conductor connecting the areas at a sufficiently greater speed than their speed through the surface layer of the ground to cause the reflected waves received at the areas to actuate the indicator simultaneously whereas the direct waves actuate the indicator at successive intervals of time.

17. Apparatus for geophysical exploration, which comprises a source of propagation of seismic waves, an elongated conductor spaced portions of which disposed substantially radially of the source rest upon the ground to receive seismic wave energy arriving from the source, and an indicator operatively associated with the conductor, the conductor being of sufficiently greater conductivity than the surface layer of the ground to cause reflected waves to actuate the indicator simultaneously whereas direct waves actuate the indicator at successive intervals of time.

LUDWIG W. BLAU.
LOUIS STATHAM.